United States Patent [19]
Adahan

[11] Patent Number: 5,762,480
[45] Date of Patent: Jun. 9, 1998

[54] RECIPROCATING MACHINE

[76] Inventor: Carmeli Adahan, 11 Netivei Am Street, Ramot 03, Jerusalem 97552, Israel

[21] Appl. No.: 632,838

[22] Filed: Apr. 16, 1996

[51] Int. Cl.⁶ ............................ F04B 35/04; F04B 21/02
[52] U.S. Cl. .................. 417/415; 417/359; 417/534; 417/566; 417/571; 74/40; 92/140
[58] Field of Search ........................ 417/359, 415, 417/534, 566, 571; 123/197.3, 197.4; 74/40; 92/138, 140

[56] References Cited

U.S. PATENT DOCUMENTS

| | | |
|---|---|---|
| 2,233,857 | 3/1941 | Trammell et al. |
| 2,548,296 | 4/1951 | Femons .................. 74/40 |
| 2,658,351 | 11/1953 | Hill . |
| 3,105,162 | 9/1963 | Stevenson . |
| 3,176,671 | 4/1965 | Stinebaugh . |
| 3,633,429 | 1/1972 | Olson . |
| 4,300,405 | 11/1981 | Szczepanek . |
| 4,455,976 | 6/1984 | McCandless . |
| 4,517,931 | 5/1985 | Nelson .................. 123/197.4 |
| 4,608,951 | 9/1986 | White . |
| 4,979,428 | 12/1990 | Nelson .................. 92/140 |
| 5,448,970 | 9/1995 | Bray . |

*Primary Examiner*—Charles G. Freay
*Attorney, Agent, or Firm*—Hedman, Gibson & Costigan, P.C.

[57] ABSTRACT

A reciprocating machine converts linear motion to rotary motion or vice-versa and is associated with a supply of working fluid, and includes rotational power apparatus having a rotational motion transfer member; a cylinder defining a longitudinal axis and having a first end at which are located working fluid input and output apparatus, and further having a second end; a piston located within the cylinder and arranged for linear, reciprocating travel along the longitudinal axis between the first and second ends; a connecting rod having a first end connected to the piston, and further having a second end portion; and linkage apparatus.

34 Claims, 7 Drawing Sheets

- - - - - - - IN GRAPH OF FIG. 3A

FIG.3B(ii)

———— IN GRAPH OF FIG. 3A

RECIPROCATING MACHINE

FIELD OF THE INVENTION

The present invention relates to reciprocating machines for converting between rotary and linear motion, or vice versa, such as pumps and motors.

BACKGROUND OF THE INVENTION

Machines for converting between rotary and linear motion or vice versa, and which employ piston and cylinder combinations, are well known. These machines, referred to herein as "reciprocating machines," may either be pumps, in which a rotating shaft and crank mechanism drive a reciprocating piston axially or linearly within a cylinder along a predetermined travel; or they may be motors, in which a piston is reciprocated axially within a cylinder along a predetermined travel, so as to drive a rotating output shaft, via a crank mechanism.

Conventional reciprocating machines of the type described above are characterized by a number of disadvantages, including the following.

1. A reciprocating piston exerts side loads on its associated cylinder due to the non-axial or non-linear force component applied thereto by a rotating drive mechanism, via a connecting rod. The side loading of the piston causes friction between the piston and the cylinder, thereby causing wear and a reduced operating efficiency of the machine. In most pumps and motors an elaborate lubrication system is employed to reduce the friction and consequent wear.
2. In conventional piston and cylinder machines, the piston is reciprocated within the cylinder, and undergoes a rapid reversal at the end of its travel; this position is known as the 'top dead center' position, and is referred to herein as "TDC". This rapid reversal at TDC results in rapid opening and closing of associated valves, thereby to cause a high noise level, as well as a high rate of wear on the valves.
3. Most pumps have a fixed power rating and a fixed drive motor speed. Such pumps utilize only a very small portion of their power when operating against low head pressures.
4. In some applications, such as pumps for supplying clean air in a medical environment, the use of lubricants between the piston and cylinder is prohibited. In such cases, costly and elaborate mechanisms are used to guide the pistons axially such that all the side loads are absorbed by rod bearings.

SUMMARY OF THE INVENTION

The present invention seeks to provide an improved reciprocating machine and converter mechanism therefore for converting between rotary and linear motion or vice versa, and in which the forces applied to the reciprocating number, e.g., a piston are substantially linear or axial, such that there occurs substantially no side-loading between the piston and cylinder.

The present invention further seeks to provide a reciprocating machine whose piston undergoes significant speed reduction in the vicinity of the top dead center position, thereby to significantly reduce the noise of the valves and their wear on the machine, as well to increase their efficiency.

The present invention seeks, yet further, to provide a reciprocating machine which is significantly more efficient than in prior art, by provision of an increased fluid displacement per revolution when piston head pressures are low, thereby facilitating higher flows while utilizing a constant power level.

According to one aspect of the present invention, there is provided a motion converter mechanism to be interposed between a driving device and a driven device to provide a rotary motion in one device and a reciprocatory motion in the other device, comprising: a housing; a reciprocatory member mounted for reciprocator movement along a longitudinal axis and having a first end coupleable to one of the devices; a rotary member mounted for rotary movement about a rotary axis and coupleable to the other of the devices; a crank arm having a first end pivotally coupled to the rotary member and a second end pivotally coupled to the reciprocatory member; and an alignment member extending transversely of the longitudinal axis and having a first end pivotally coupled to the reciprocatory member and a second end pivotally coupled to the housing such as to maintain the reciprocatory member in general coaxial alignment with the longitudinal axis, and thereby substantially to prevent side loading of the reciprocatory member during its reciprocatory movements.

According to further features in the preferred embodiments of the invention described below, the reciprocatory member includes a transverse extension; the second end of the crank arm is pivotally coupled to the reciprocatory member at its juncture with the transverse extension; and the first end of the alignment member is pivotally coupled to the outer end of the transverse extension of the reciprocatory member. In addition, the rotary axis of the rotary member is located between the opposite ends of the reciprocatory member such as to align the first end of the crank arm with the longitudinal axis of the reciprocatory member at a location between the first end of the reciprocatory member and the second end of the crank arm, and thereby to effect a speed reduction of the reciprocatory member, in the vicinity of the top dead center position of the reciprocatory member. The rotary axis of the rotary member may be selectively positionable at a predetermined location laterally of the longitudinal axis of the reciprocatory member to change the magnitude of displacements of the reciprocatory member during its reciprocatory movements.

Various embodiments are described wherein the mechanism is included in a piston-cylinder assembly of a pump driven by an external driving device. However, many other possible applications of the invention referred to in the description below include fluid motors utilizing a pressurized fluid for driving a load, and gasoline engines for driving a load.

BRIEF DESCRIPTION OF THE DRAWINGS

The present invention will be more fully understood and appreciated from the following detailed description, taken in conjunction with the drawings, in which:

FIG. 3B(i) is a diagram of a prior art system;

FIG. 3B(ii) is a diagram of a system of the present invention; and

DETAILED DESCRIPTION OF THE INVENTION

Figure 1:
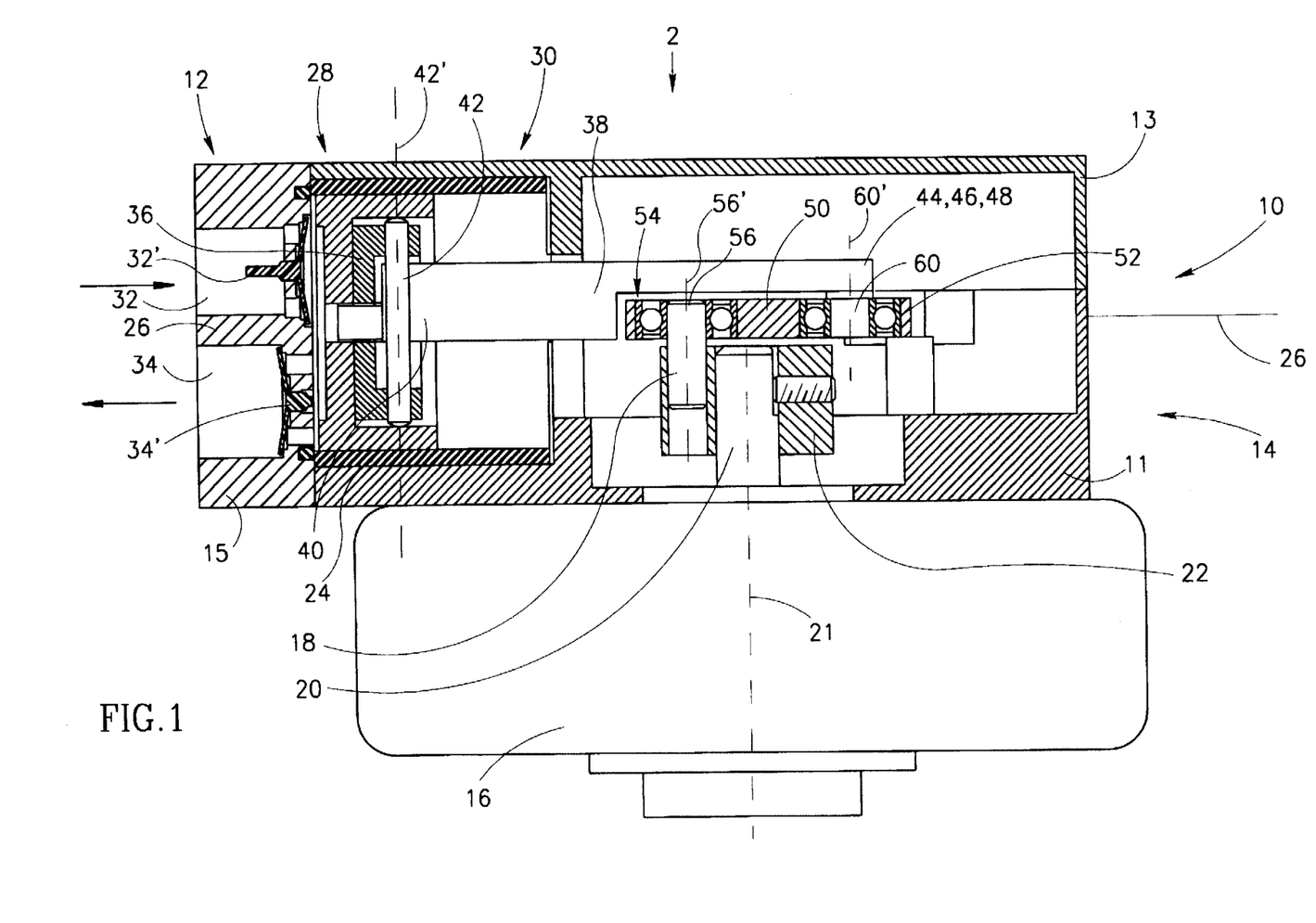
FIG. 1 is a cross-sectional view of a reciprocating machine, constructed in accordance with a first embodiment of the invention, and functioning as an electrically driven pump.
Figure 2A:
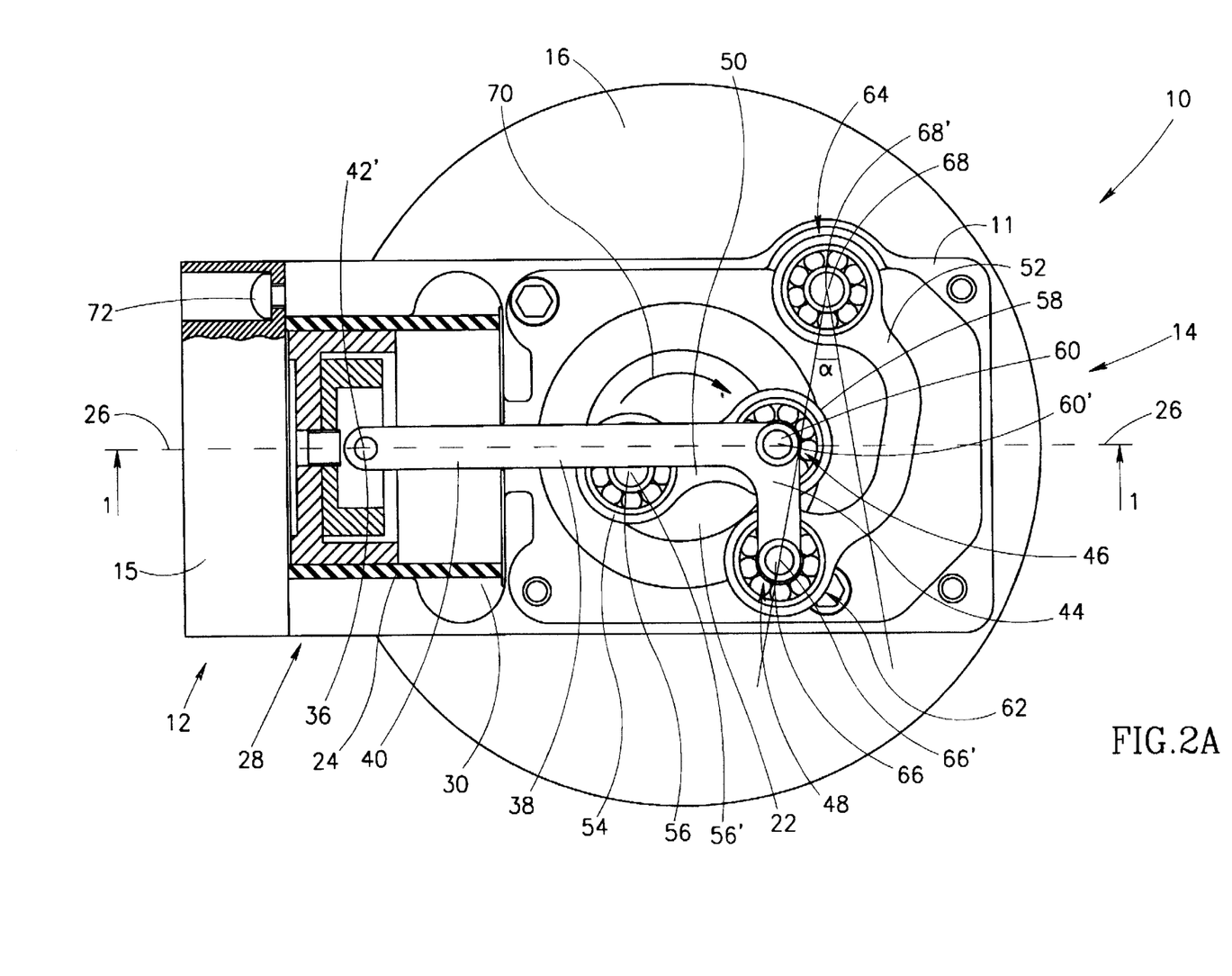
FIG. 2A is a detailed top view of the reciprocating machine of FIG. 1, taken in the direction of arrow 2 therein, wherein the piston thereof is at a forward end of its travel.
Figure 2B:
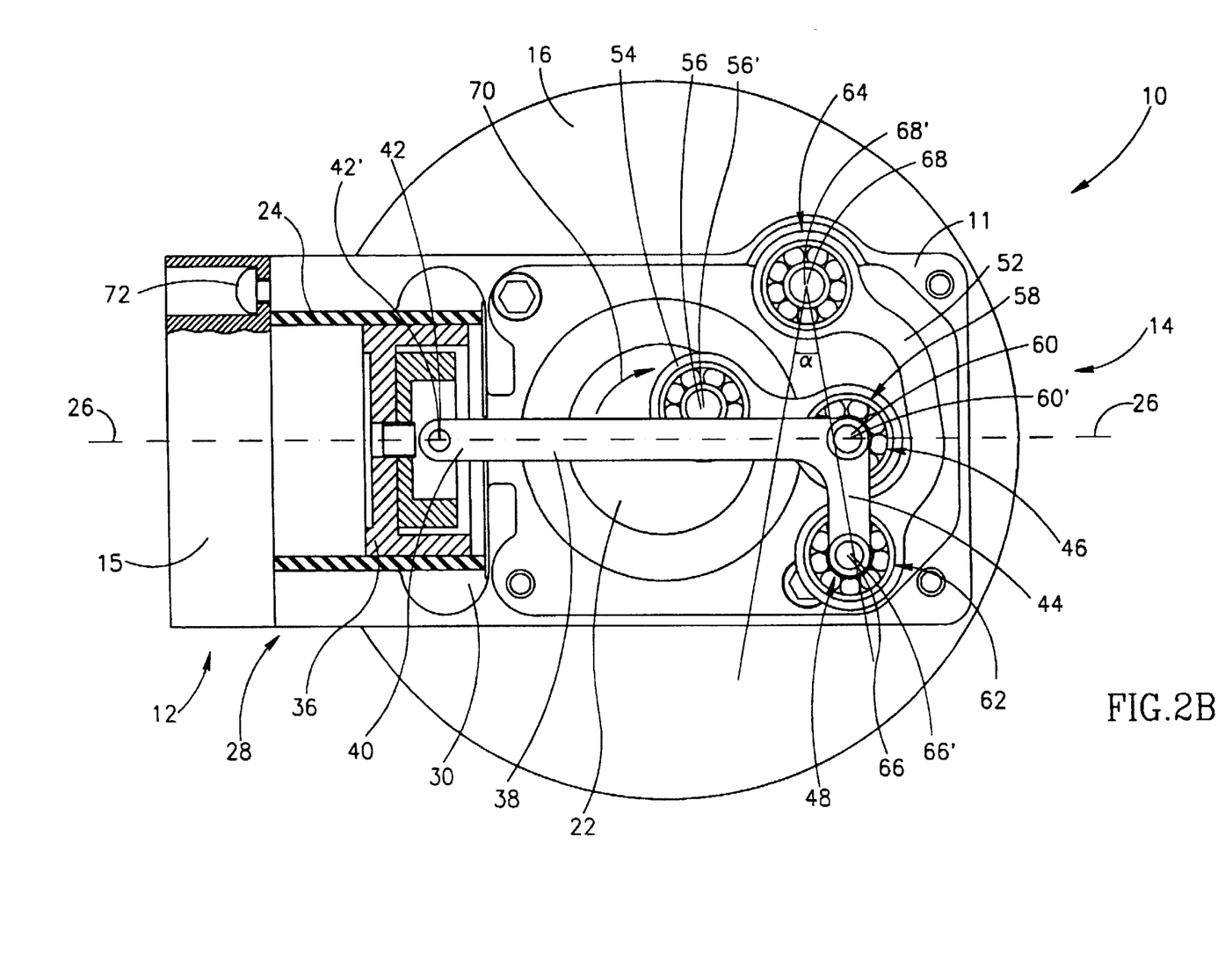
FIG. 2B is a view similar to that of FIG. 2A, but showing the piston close to a rear end of its travel.

Referring now to FIGS. 1, 2A and 2B, there is provided a reciprocating machine, referenced generally 10, which is employed for converting linear motion to rotary motion or vice-versa. In general, machine 10 has a first end 12, which is preferably associated with a supply of working fluid (not shown), and a second end 14, which is associated with a rotational power source, referenced 16. As seen in FIG. 1, power source 16 has a rotational motion transfer member 18. In the present example, machine 10 is exemplified by a pump, wherein power source 16 is an electric motor which has a power output shaft 20 on which is mounted a rotary member in the form of a flywheel 22 to which motion transfer member 18 is connected, and which is operative to rotate motion transfer member 18 so as to provide a pumping head at first end 12, associated with the supply of working fluid.

It will be appreciated that, in accordance with an alternative embodiment of the invention, the working fluid is operative to drive the machine 10, such that power source 16 supplies power not to the machine, but is itself powered by the machine and is used to supply power to an external device. In this example, power source 16 may be any sort of motor or electrical generator.

While the machine 10 of the invention is exemplified such that first end 12 thereof is associated with a working fluid, it is also envisaged that the present invention could be usefully employed as another type of machine, in which a working member is driven by the machine, via a reciprocating member. Such a machine could be a sewing machine, for example, or any other machine in which a reciprocating motion of a working member is desired. In this case, the reciprocating member would be guided along a linear path by a guide member.

Referring back to the present example, the reciprocating machine is formed of a bottom housing portion 11 and a top housing portion 13, which are sealed together, and which are closed at first end 12, by a valve plate 15. A cylinder 24, having a longitudinal axis 26, is located within and fastened to bottom housing portion 11. Cylinder 24 has a first end 28, adjacent to first end 12 of the machine, and a second end 30. Working fluid input and output ports, respectively referenced 32 and 34 (FIG. 1), are located at first end 28, and each is provided with a one-way umbrella valve, respectively referenced 32' and 34'.

A piston 36 is located within the cylinder 24, and is arranged for linear, reciprocating travel along longitudinal axis 26, between the first and second ends 28 and 30, respectively, of cylinder 24. There is also provided a reciprocatory member in the form of a connecting rod 38, having a first end 40 which is connected to the piston 36 via a pivot 42. Connecting rod 38 also has a transverse extension 44, which extends laterally from the remainder of connecting rod 38 via an elbow 46, and terminates at second end 48.

It will be appreciated that, in an embodiment in which machine 10 is not associated with a working fluid, piston 36 has associated therewith a working member (not shown) and functions as a drive member, and cylinder 24 functions solely as a linear guide therefor.

In accordance with the present invention, a linkage system is arranged between the connecting rod 38, and the motion transfer member 18, for converting between the linear motion of the piston 36 and rotary motion of the motion transfer member 18. The linkage system of the present invention is characterized by a plurality of pivots which are operative to absorb substantially all those force components which result from rotation of the motion transfer member 18, and which are non-axial in relation to the longitudinal axis 26, thereby to maintain the connecting rod 38 in generally coaxial alignment with the longitudinal axis 26, and thus to substantially prevent side loading of the piston 36 during travel in the cylinder 24.

It is seen that the linkage system of the present invention is formed principally of a crank member or arm 50 and an alignment member 52. Crank member 50 has a first end 54 connected via a first pivot 56 to the motion transfer member 18 so as to be rotatably driven thereby, and further has a second end 58 connected via a second pivot 60 to the elbow 46 of the connecting rod 38. Alignment member 52 typically has a generally U-shaped configuration, and has first and second ends, respectively referenced 62 and 64. The first end 62 of alignment member 52 is connected, via a third pivot 66, to the second end 48 of the transverse extension 44 of the connecting rod 38, and the second end 64 of member 52 is connected via a fourth pivot 68 to bottom housing portion 11. As seen, the alignment member 52 preferably extends transversely across the longitudinal axis 26, thereby to add to the compactness of the machine construction.

It is of particular importance that the first, second, third and fourth pivots, respectively referenced 56, 60, 66 and 68, respectively define first, second, third and fourth parallel pivot axes, respectively referenced 56', 60', 66' and 68', which are transverse, preferably perpendicular, to longitudinal axis 26. It is also advantageous that, as seen in the illustrated embodiment, first end 40 of the connecting rod 38 is connected to the piston 36 via the pivot 42, which defines a fifth pivot axis 42', parallel to the described first, second, third and fourth pivot axes, and that first end 40 of connecting rod 38 is connected to pivot 42 so as to be slidable along the pivot axis 42'. Preferably, all of the first, second, third and fourth pivots are provided by ball bearing constructions.

It has been mentioned that first end 62 of alignment member 52 is pivotally connected to the second end 48 of the connecting rod 38, and that second end 64 of alignment member 52 is pivotally connected to bottom housing portion 11. As indicated earlier and as seen particularly in FIGS. 2A and 2B, the alignment member extends transversely across the longitudinal axis 26 of connecting rod 38 such that a line through the two pivotal ends 66, 68 of the alignment member assumes the angle (in one direction with respect to axis 26 in one limit position of the connecting rod, and the same angle) in the opposite direction with respect to axis 26 in the opposite limit position of the connecting rod.

Accordingly, when the machine is operated, such that crank member 50 is rotated, as indicated by arrow 70 (FIGS. 2A and 2B), thereby to cause a reciprocating motion of connecting rod 38, the first end 62 of alignment member 52 swings through the predetermined arc α (FIGS. 2A and 2B), typically in the range 5°–25°. The precise angle depends on the relative physical dimensions of the machine components. This swinging motion causes the movement of connecting rod 38 to be substantially along longitudinal axis 26. It will thus be appreciated that all side loading that would otherwise have been transferred from the crank member 50 to connecting rod 38, is substantially absorbed by alignment member 52, and is applied, instead, to bottom housing portion 11. The remaining forces, which are substantially axial, are applied to connecting rod 38, and thus also to piston 36.

In operation as a pump, as piston 36 moves to the rear end of its travel, as illustrated in FIG. 2B, it draws a working fluid through inlet port 32 and into the cylinder 24, via one way umbrella valve 32'. On its return stroke, piston 36 is operative to pump the working fluid out through outlet port 34 through one way umbrella valve 34'. It will be appreciated that the illustrated machine 10, when operating as a pump, can be used either to build a high positive pressure at outlet port 34, or to provide a vacuum at inlet port 32.

It will be appreciated by persons skilled in the art, that the above-described reciprocating machine can also function as a motor, such as a gasoline engine, in which, rather than the piston driving a working fluid (as in the described pump embodiment), different valving is instead employed to reciprocally drive the piston. In a case wherein the machine is employed as a motor, there could be provided, by way of non-limiting example only, an electrical generator in place of the illustrated electric motor 16.

It will be further be appreciated by persons skilled in the art, that, while prior art constructions which employ piston rod guides to eliminate side loading on the piston, they are linear rod bearings, which require the mechanism to be very long, and which are also costly, and their loading is very high.

It is particularly noted that the unique linkage system of the present invention includes a total of five pivot locations, one of which has a double function as a radial slide, which together prevent side loading of piston 36. The described use of pivots, and, in particular, of ball bearing pivots as shown and described above, are very efficient, free of slack, and are thus quiet.

Furthermore, unlike conventional crank systems, whereby a driving motor (equivalent to motor 16 in FIGS. 1, 2A and 2B) is placed a relatively large distance away from piston 36, making for a relatively long machine assembly, the machine of the present invention is extremely compact, due to the unique construction of the linkage connecting between the motor 16 and the piston 36, without compromising the long piston stroke capacity.

Figure 3A:
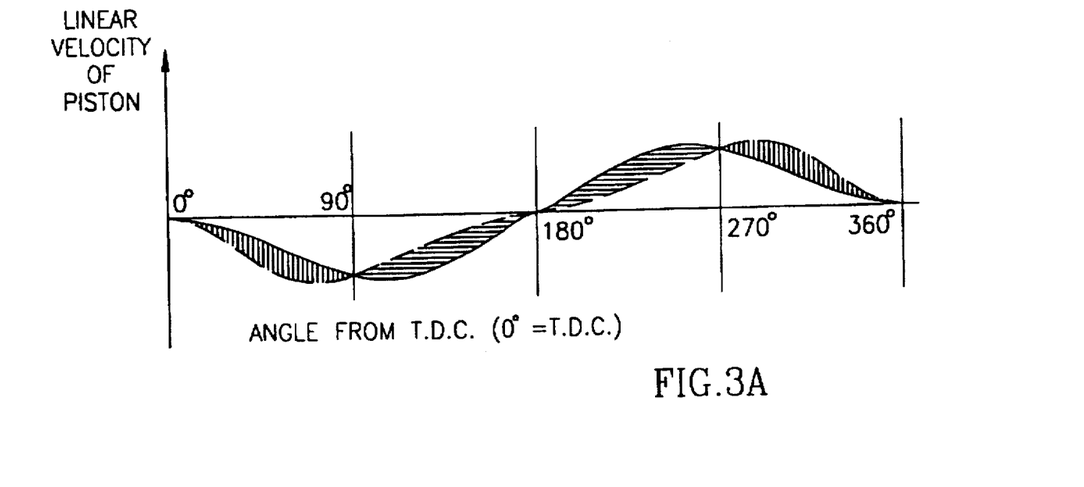
FIG. 3A is a graph representation of piston velocity versus piston position.
Figure 3B:
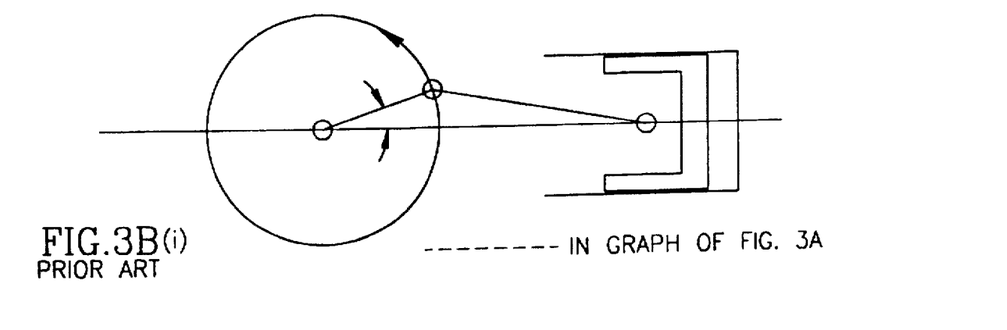

A major feature of the present invention is the provision of very slow movement of the piston 36, as seen in the graph of FIG. 3A, in the vicinity of the Top Dead Center (TDC) position, i.e. when the piston 36 is at the uppermost end of the cylinder 24, as seen in FIG. 2A In this position, the valves usually reverse their function from being open to closed or the reverse.

By referring to the graph of FIG. 3A in conjunction with the diagrams in FIG. 3B(i), which represents a prior art system, and FIG. 3B(ii), which represents machine 10 of the present invention, it is clearly seen that in the machine of the present invention, piston 36 exhibits a marked slowdown, relative to the prior art, at TDC −90°; the difference in respective piston velocities is indicated by the areas marked by vertical hatching. It is further seen that in the region 90°–270°, piston 36 exhibits a marked acceleration relative to the prior art; this acceleration relative to the prior art system is indicated by the areas marked by horizontal hatching. Accordingly, while overall piston translation is maintained, the distribution over the piston cycle and thus the exploitation thereof, is far more efficient in the present invention than in the prior art, as described below.

It is extremely beneficial that the travel of the piston in the vicinity of the TDC be slow, as this allows time for the valves to open or close completely, making their performance efficient. This also reduces both the noise level of the valves and the wear thereof, and, further allows a small pump or motor to perform at higher RPM and thus provide higher performance. In other words, the above-described slowing of the piston at TDC results in much more efficient valving, as the opening and closing of the valves can happen over a much longer portion of the cycle as compared with a conventional crank mechanism, such as in a gasoline engine. This enables an increased fluid displacement per revolution when compared with known pumps.

This feature is provided by virtue of the operation of crank member 50 via the motion transfer member 18 (or vice versa). In particular, at TDC a large angular rotation of flywheel 22 and thus also of motion transfer member 18. Since in the vicinity of TDC, end 54 of crank member 50 becomes aligned with the longitudinal axis 26 of connecting rod 38 at a location between its end 40 and its pivotal coupling 60 to the crank member, little axial travel of connecting rod 38 is produced as crank member 50 swings through an arc together with motion transfer member 18, therby effecting a reduction in the axial velocity of the connecting rod.

The present invention is further characterized by its constructional layout. In particular, bottom housing portion 11 is connected to the casing of motor 16, and further combines to support fourth pivot 68, and to define a nesting cavity for cylinder 24. Upper housing portion 13 is essentially a cover for bottom housing portion 11, and is not required for the operation of the machine 10. A valve plate 15 is connected to upper housing portion 13 and bottom housing portion 11 with screws 72 (FIGS. 2A and 2B).

Figure 4A:
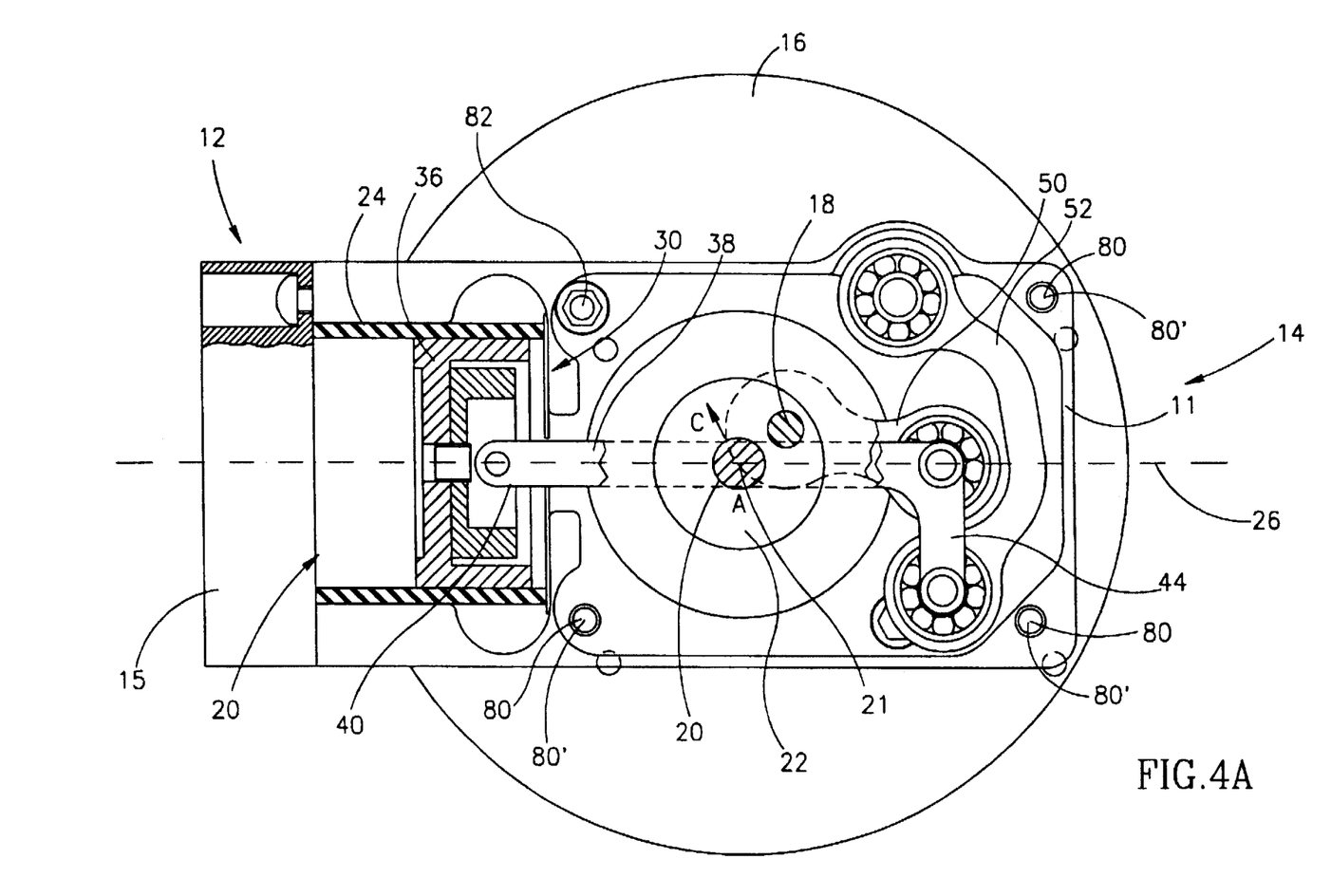
FIG. 4A is a view similar to that of FIG. 2B, but partially cut away so as to show the power output shaft of the power source therein in a first position, providing a maximum piston travel.
Figure 4B:
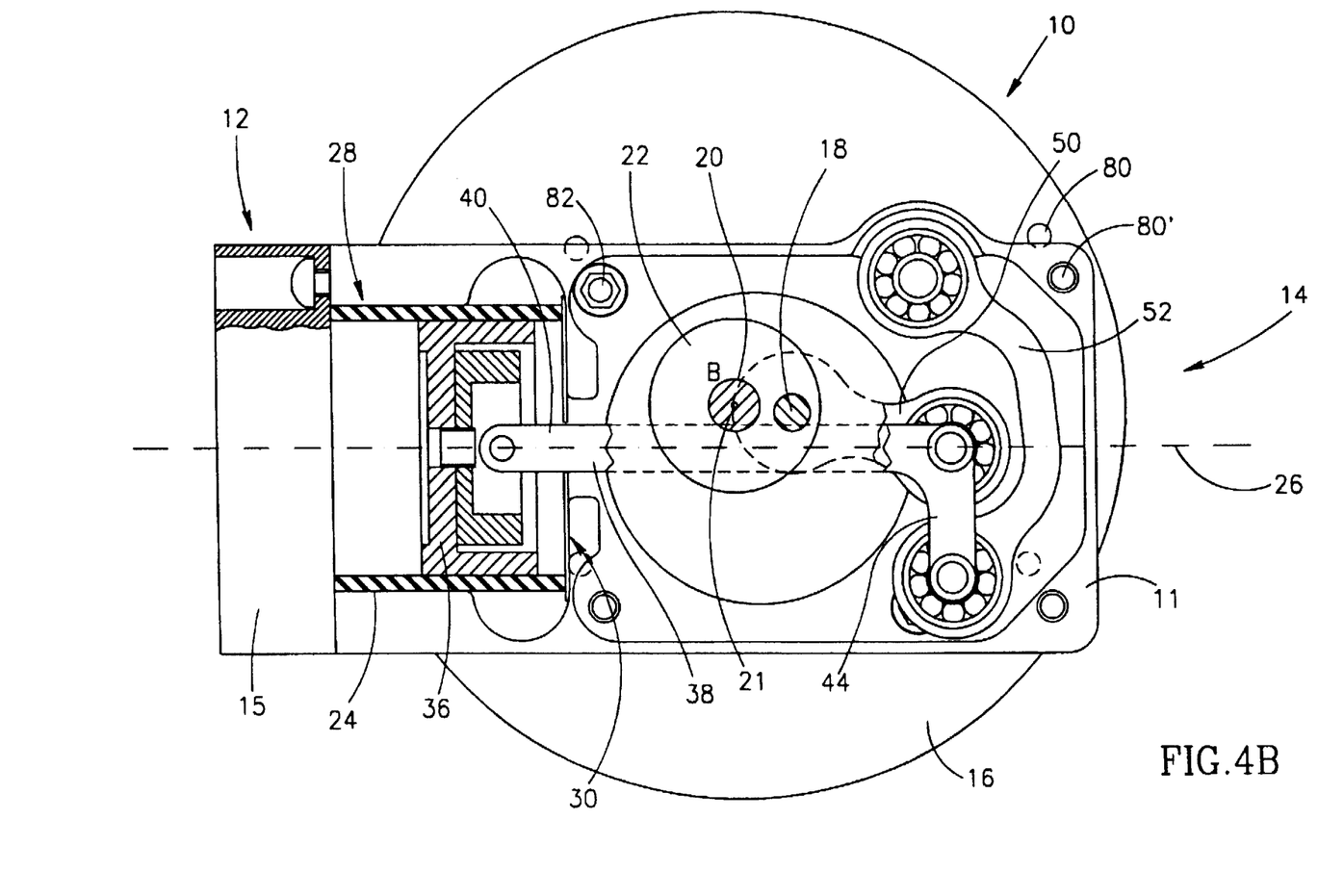
FIG. 4B is a view similar to that of FIG. 4A, but wherein the power output shaft is in a second position, providing a reduced piston travel.

Referring now to FIGS. 4A and 4B, it is seen that the piston travel, and thus the pump displacement, may be decreased by moving the center of motor 16 radially outward and forward from location A (FIG. 4A) to location B (FIG. 4B) in the direction of arrow C (FIG. 4A).

As seen in FIG. 4A, power output shaft 20 is initially aligned such that its axis of rotation 21 intersects with longitudinal axis 26. In this position, piston 36 travels along the complete axial length of cylinder 24, thus providing the maximum displacement available for the machine. In FIG. 4B, however, it is seen that the position of power output shaft 20 has been moved, in radially outward and forward directions, such that axis of rotation 21 no longer intersects with longitudinal axis 26. In this position, the most rearward position of piston 36 is forward of the rear end 25 of cylinder 24, such that the piston stroke or displacement is shortened.

Adjustment of the power output shaft is provided by changing the relative positions of the entire power source 16 relative to the housing portion 11. This may be done either by providing several screw holes, shown schematically at 80 and 80', in FIGS. 4A and 4B, into which screw-type fasteners 82 may be inserted, or by any other suitable mechanism.

This relocation of power output shaft 20 relative to axis 26 and piston 36 reduces the stroke of the piston without changing the TDC, thereby allowing the pump to produce higher pressure or vacuum levels without an increase in electrical power consumption. Unlike conventional crank mechanisms neither the alignment of piston connecting rod 38 nor the side loading on it changes, due to the fact that both of these factors are controlled by alignment member 52.

Figure 5:
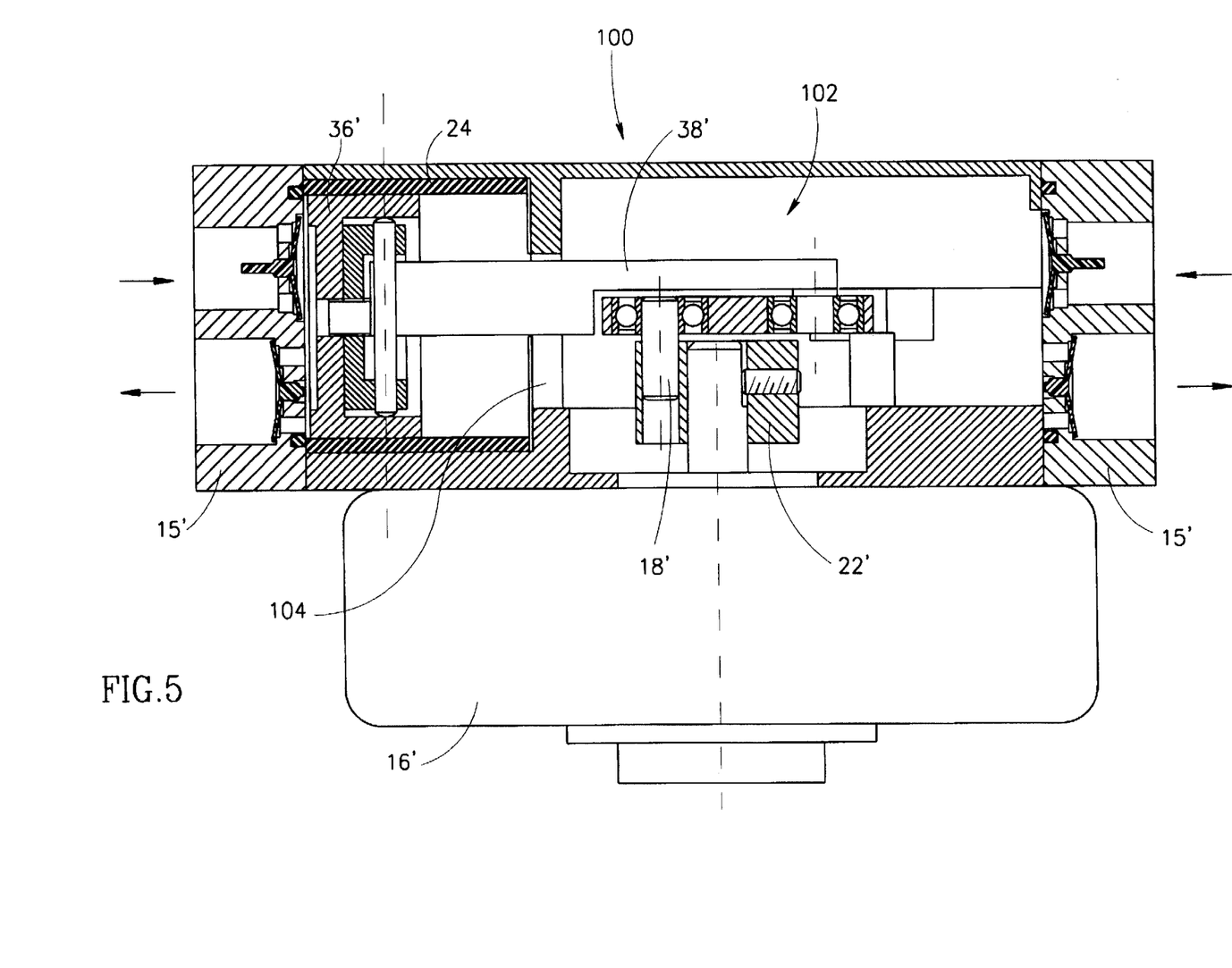
FIG. 5 is a cross-sectional view of a reciprocating machine, constructed in accordance with a second embodiment of the invention, and functioning as an electrically driven bi-directional pump.

Reference is now made to FIG. 5, in which is shown an electrically driven bi-directional or double acting pump, referenced generally 100. In general, pump 100 is similar to pump 10 shown and described above in conjunction with FIGS. 1–3, and is thus not described again herein in detail. Components of pump 100 seen in any of FIGS. 1–2B, are denoted in FIG. 5 with corresponding referenced numeral with the addition of a prime (') suffix.

Pump 100 differs from pump 10 in that it is constructed to be a bi-directional pump, and thus has a valve plate 15' on both ends. Accordingly, piston 36' is operative to pump fluid in both directions, thereby to double the pump output as compared with that of machine 10.

It is seen that a rear housing portion, referenced generally 102, in which the crank mechanism is located, has a relatively large volume relative to the volume of cylinder 24'. Due to the relatively large volume of rear housing portion 102, piston 36' is operative to stop pumping on the backstroke when the pressure in housing portion 102 reaches a predetermined magnitude, and so as to merely compress and release the working fluid during reciprocation. The interior of rear housing portion 102 is hermetically sealed, together with the remainder of the housing, so as to function as an extension of the volume of cylinder 24'. This is facilitated by provision of large opening 104 provided between rear housing portion 102 and piston 36', through which connecting rod 38' extends.

This effective extension is used so as to double the flow at low pressure or vacuum levels, with this added flow diminishing as the pressure or vacuum rise. It will thus be appreciated that the pump 100 dissipates the same power as in a single acting pump at high vacuum or pressure levels as the double acting pump, with the added benefit of increased flows at low pressure/vacuum levels, and a down-sized mechanism, pump and motor.

In the prior art, it is generally sought to seal the cylinder from the remainder of the machine casing, thus, in many cases, also requiring dynamic sealing of the connecting rod or piston rod with the casing. It will thus be appreciated that, in the present embodiment, not only is it not required to provide a dynamic sealing, as described, but the rear volume is used as an additional working volume, thereby increasing the fluid output of the machine.

It will be appreciated that, because there is negligible side or radial load between piston 36 (36') and cylinder 24 (24') in any of the described embodiments of the reciprocating machine of the present invention, the cylinder and piston need not be lubricated, without the risk of wear. The non-lubricated, low friction mechanism produces pumping efficiencies unsurpassed in the art, and with significantly less heat generation or a need for forced cooling.

It will be appreciated by persons skilled in the art that the present invention is not limited by what has been shown and described hereinabove, merely by way of illustrative example. Rather, the scope of the present invention is limited solely by the claims, which follow:

I claim:

1. A motion converter mechanism to be interposed between a driving device and a driven device to provide a rotary motion in one device and a reciprocatory motion in the other device, comprising:

a housing;

a reciprocatory member mounted for reciprocatory movement along a longitudinal axis and having a first end coupleable to one of the devices;

a rotary member mounted for rotary movement about a rotary axis and coupleable to the other of the devices;

a crank arm having a first end pivotally coupled to said rotary member and a second end pivotally coupled to said reciprocatory member;

and an alignment member extending transversely of said longitudinal axis and having a first end pivotally coupled to said reciprocatory member and a second end pivotally coupled to said housing such as to maintain said reciprocatory member in general coaxial alignment with said longitudinal axis, and thereby substantially to prevent side loading of said reciprocatory member during its reciprocatory movements.

2. The mechanism according to claim 1, wherein:

said reciprocatory member includes a transverse extension;

said second end of said crank arm is pivotally coupled to said reciprocatory member at its juncture with said transverse extension;

and said first end of said alignment member is pivotally coupled to an outer end of said transverse extension of said reciprocatory member.

3. The mechanism according to claim 1, wherein said rotary axis of said rotary member is located such that, in the vicinity of the top dead center position of said reciprocatory member, said first end of said crank arm is aligned with said longitudinal axis of said reciprocatory member at a location between said first end of said reciprocatory member and said pivotal coupling thereof to said second end of said crank arm, thereby effecting a reduction in the linear velocity of said reciprocatory member in the vicinity of the top dead center position thereof.

4. The mechanism according to claim 3, wherein said rotary axis of said rotary member is selectively positionable at a predetermined location laterally of said longitudinal axis of said reciprocatory member so as to change the magnitude of displacements of said reciprocatory member during reciprocatory movements thereof.

5. The mechanism according to claim 1, wherein all said pivotal couplings are along axes parallel to each other and perpendicular to said longitudinal axis.

6. The mechanism according to claim 1, wherein said first end of said reciprocatory member is coupled to a piston movable within a cylinder of a piston-cylinder assembly.

7. The mechanism according to claim 6, wherein said piston is pivotally connected to said first end of said reciprocatory member.

8. The mechanism according to claim 6, wherein said rotary member is coupled to a driving device for driving said piston-cylinder assembly in a fluid pump.

9. The mechanism according to claim 8, wherein said fuel pump is a double-acting pump in which said reciprocatory member is coupled at a first end thereof to a piston-cylinder assembly, a second end of said reciprocatory member being arranged for motion within a cylindrical extension of the cylinder of said piston-cylinder assembly.

10. The mechanism according to claim 9, wherein the cylinder in the piston-cylinder assembly is fluidly coupled to and is of larger volume than, said cylindrical extension thereof the piston assembly at the opposite end of said reciprocatory.

11. The mechanism according to claim 6, wherein said piston-cylinder assembly constitutes a drive device for driving said rotary member.

12. The mechanism according to claim 11, wherein said piston-cylinder assembly drive is in a fluid motor utilizing a pressurized fluid for driving said rotary member.

13. A reciprocatory machine, comprising:

a housing;

a piston-cylinder assembly including a cylinder and a piston, one of which is a member fixed to said housing, and the other of which is a member displaceable along a longitudinal axis of said fixed member;

a reciprocatory member having a first end coupled to said displaceable member and reciprocable along said longitudinal axis;

a rotary member mounted for rotary movement about a rotary axis;

a crank arm having a first end pivotally coupled to said rotary member and a second end pivotally coupled to said reciprocatory member;

and an alignment member extending transversely of said longitudinal axis and having a first end pivotally coupled to said reciprocatory member and a second end pivotally coupled to said housing such as to maintain said reciprocatory member in general coaxial alignment with said longitudinal axis, and thereby substantially to prevent side loading of said reciprocatory member during its reciprocatory movements.

14. The machine according to claim 13, wherein:

said reciprocatory member includes a transverse extension;

said second end of said crank arm is pivotally coupled to said reciprocatory member at its juncture with said transverse extension;

and said first end of said alignment member is pivotally coupled to an outer end of said transverse extension of said reciprocatory member.

15. The machine according to claim 13 wherein said rotary axis of said rotary member is located such that, in the vicinity of the top dead center position of said reciprocatory member, said first end of said crank arm becomes aligned with said longitudinal axis of said reciprocatory member at a location between said first end of said reciprocatory member and its pivotal coupling to said second end of said crank arm thereby effecting a reduction in the linear velocity of said reciprocatory member, in the vicinity of the top dead center position thereof.

16. The machine according to claim 15, wherein said rotary axis of said rotary member is selectively positionable at a predetermined location laterally of said longitudinal axis of said reciprocatory member to change the magnitude of displacements of said reciprocatory member during its reciprocatory movements.

17. The machine according to claim 13, wherein all said pivotal couplings are along axes parallel to each other and perpendicular to said longitudinal axis.

18. The machine according to claim 13, wherein said piston to said displaceable member and said cylinder is fixed to said housing.

19. The machine according to claim 18, wherein said piston is pivotally coupled to said first end of said reciprocatory member.

20. The machine according to claim 18, wherein said rotary member is coupled to a driving device for driving said piston within said cylinder of a fluid pump.

21. The machine according to claim 20, wherein said fluid pump is a double-acting pump in which said reciprocatory member is coupled at a first end thereof to a piston and drives said piston within a cylinder fixed to said housing at said first end of said reciprocatory member, a second end of said reciprocatory member being arranged for motion within a cylindrical extension of the cylinder of said piston-cylinder assembly.

22. The machine according to claim 21, wherein said cylinder is fluidly coupled to, and is of larger volume than, said cylindrical extension thereof.

23. The machine according to claim 22, wherein said piston and cylinder are parts of a fluid motor utilizing a pressurized fluid for driving said rotary member.

24. The machine according to claim 13, wherein said piston-cylinder assembly constitutes a drive device for driving said rotary member.

25. A reciprocatory pump, comprising:

a housing;

a piston-cylinder assembly including a cylinder and a piston, one of which members is fixed to said housing, and the other of which members is displaceable along a longitudinal axis of said fixed- member for pumping a fluid;

a reciprocatory member having a first end coupled to said displaceable member and reciprocable along said longitudinal axis;

a rotary member mounted for rotary movement about a rotary axis and coupled to a drive;

a crank arm having a first end pivotally coupled to said rotary member and a second end pivotally coupled to said reciprocatory member;

and an alignment member extending transversely of said longitudinal axis and having a first end pivotally coupled to said reciprocatory member and a second end pivotally coupled to said housing such as to maintain said reciprocatory member in general coaxial alignment with said longitudinal axis, and thereby substantially to prevent side loading of said reciprocatory member during its reciprocatory movements.

26. The pump according to claim 25, wherein:

said reciprocatory member includes a transverse extension, said second end of said crank arm is pivotally coupled to said reciprocatory member at its juncture with said transverse extension;

and said first end of said alignment member is pivotally coupled to the outer end of said transverse extension of said reciprocatory member.

27. The pump according to claim 25, wherein said rotary axis of said rotary member is located such that, in the vicinity of the top dead center position of said reciprocatory member, said first end of said crank arm becomes aligned with said longitudinal axis of said reciprocatory member at a location between said first end of said reciprocatory member and its pivotal coupling to said second end of said crank arm thereby effecting a reduction in the linear velocity of said reciprocatory member, in the vicinity of the top dead center position of said reciprocatory member.

28. The pump according to claim 27, wherein said rotary axis of said rotary member is selectively positionable at a predetermined location laterally of said longitudinal axis of said reciprocatory member to change the magnitude of displacements of said reciprocatory member during its reciprocatory movements.

29. The pump according to claim 25, wherein said fluid pump is a double-acting pump in which said reciprocatory member is coupled at a first end thereof to a piston and drives said piston within a cylinder fixed to said housing at said first end of said reciprocatory member, a second end of said reciprocatory member being arranged for motion within a cylindrical extension of the cylinder of said piston-cylinder assembly.

30. The pump according to claim 29, wherein said cylinder is fluidly coupled to, and is of larger volume than, said cylindrical extension thereof.

31. A motor for driving a load, comprising:
- a housing;
    - a piston-cylinder assembly including a cylinder member and a piston, one of which is a member fixed to said housing, and the other of which is a member displaceable along a longitudinal axis of said fixed member and serves as a drive for said motor,
- a reciprocatory member having a first end coupled to said displaceable member and reciprocable along said longitudinal axis;
- a rotary member mounted for rotary movement about a rotary axis and coupled to the load;
- a crank arm having a first end pivotally coupled to said rotary member and a second end pivotally coupled to said reciprocatory member;
- and an alignment member extending transversely of said longitudinal axis and having a first end pivotally coupled to said reciprocatory member and a second end pivotally coupled to said housing such as to maintain said reciprocatory member in general coaxial alignment with said longitudinal axis, and thereby substantially to prevent side loading of said reciprocatory member during its reciprocatory movements.

32. The motor according to claim 31, wherein:

said reciprocatory member includes a transverse extension;

said second end of said crank arm is pivotally coupled to said reciprocatory member at its juncture with said transverse extension; and said first end of said alignment member is pivotally coupled to the outer end of said transverse extension of said reciprocatory member.

33. The motor according to claim 31, wherein said rotary axis of said rotary member is located such that, in the vicinity of the top dead center position of said reciprocatory member, said first end of said crank arm becomes aligned with said longitudinal axis of said reciprocatory member at a location between said first end of said reciprocatory member and its pivotal coupling to said second end of said crank arm thereby effecting a reduction in the linear velocity of said reciprocatory member, in the vicinity of the top dead center position of said reciprocatory member.

34. The motor according to claim 31, wherein said piston is said displaceable member and said cylinder is fixed to said housing.

* * * * *